RETURN MECHANISM

Filed May 29, 1967

INVENTOR.
MICHAEL S. SHEBANOW
BY John J. McCormack
ATTORNEY

INVENTOR
MICHAEL S. SHEBANOW
BY
ATTORNEY

Jan. 7, 1969 M. S. SHEBANOW 3,420,521

RETURN MECHANISM

Filed May 29, 1967 Sheet 3 of 4

INVENTOR.
MICHAEL S. SHEBANOW
BY
John J. McCormack
ATTORNEY

Jan. 7, 1969 M. S. SHEBANOW 3,420,521

RETURN MECHANISM

Filed May 29, 1967 Sheet 4 of 4

INVENTOR.
MICHAEL S. SHEBANOW
BY
John J. McCormack
ATTORNEY 3,420,521
RETURN MECHANISM Michael S. Shebanow, Medfield, Mass., assignor to Honeywell Inc., Minneapolis, Minn., a corporation of Delaware Filed May 29, 1967, Ser. No. 641,829
U.S. Cl. 271—84 14 Claims
Int. Cl. B68h 29/46

ABSTRACT OF THE DISCLOSURE

A record return mechanism for returning Mass Memory record strips to a storage file, this mechanism including, in the described embodiment, a vacuumatic deceleration plate adapted to vacuumatically decelerate returning strips sliding therealong and thereafter thrust them into the file, the plate being operatively associated with a reciprocating actuator, a vacuum supply chamber, a "snap-in" throat closure at the "return" end of the file and a reciprocable lifter for lifting a decelerated strip into alignment prior to injecting it through the throat and into the file.

PROBLEMS, INVENTION FEATURES

Figure 1:
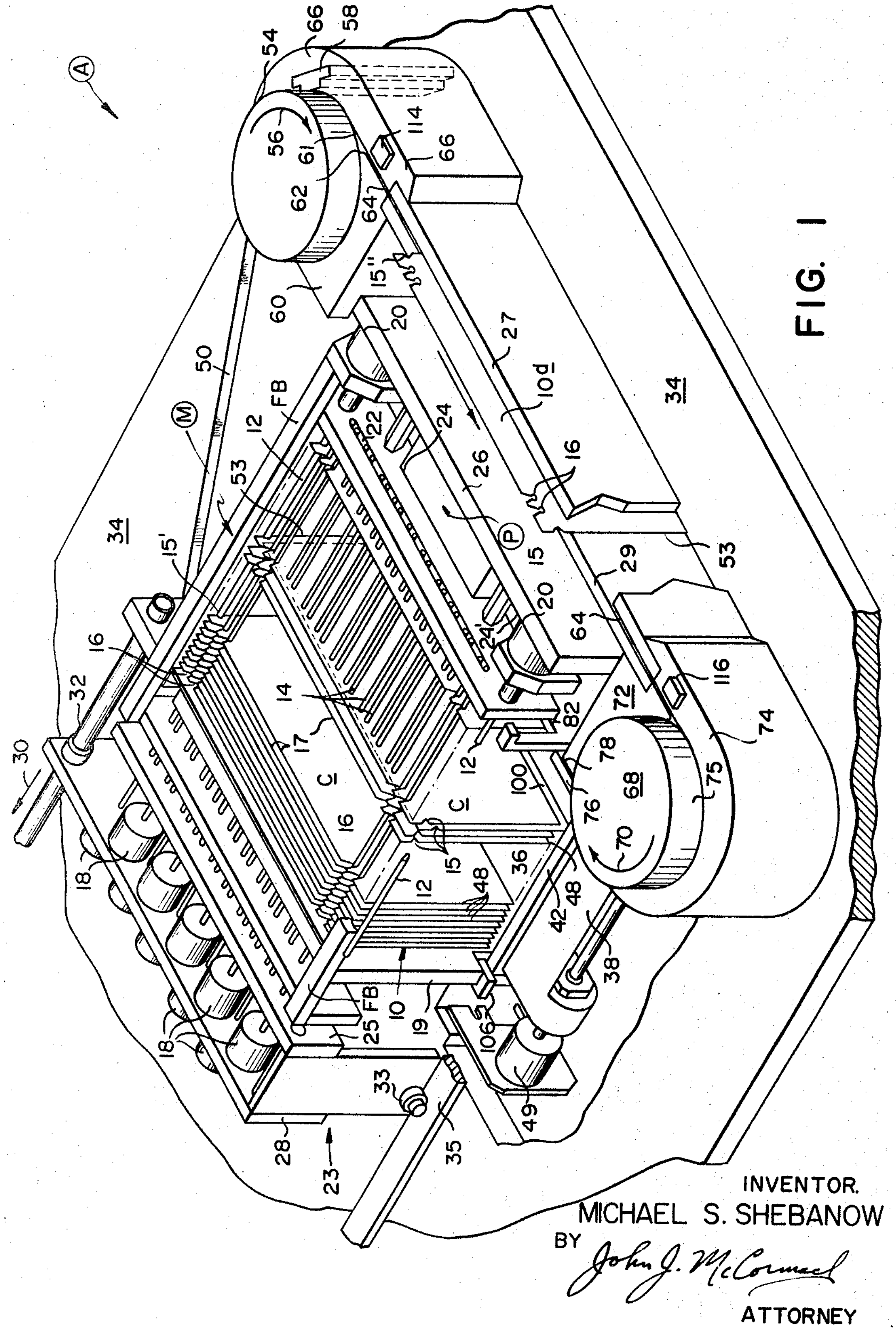

Randomly-accessible files of unit records, often characterized as RAM Random Access Memory (RAM) or Mass Memory (MM) files, have received a great deal of construction lately by workers in the data processing arts. It is widely appreciated that such a MM file offers the basic advantages of the unit record such as flexibility of recording and storage, etc. along with most advantages of any RAM system such as short access-time, low handling cost and the like. While unit record RAM machines have certain advantages over competing disc or tape RAM machines, they do present serious difficulties in record manipulation (card-transport, selection, return, etc.) and these have heretofore curtailed some of the growth that might be expected for them. Of course, a major problem is that the much-desired short "access-time" demands an extremely fast record manipulation, much faster than anything hithereto known. For instance, no mechanism has to date been proposed which returns RAM unit records to a main file fast enough except for certain overly-complex designs. Typically, a RAM record must be directed adjacent one (return) end of the file, decelerated there, aligned with the pack and then thrust back into the pack to be held there—all this being done within a small fraction of a second. The present invention is directed to satisfying these rigorous requirements in a RAM record return mechanism.

It will be understood that in a typical MM File, the Mass Memory Magazine (MMM) will contain a pack of unit record strips, each strip having a differently-coded set of notches provided along its "reference edge" for unique selection thereof by select rods. As is understood in the art, these strips may then be automatically selected and released by manipulating the selection rods. Once "selected," such a strip is characteristically transported very rapidly past a processing station to be recirculated and returned adjacent the "return" end of the magazine. Since it is typically expected that this strip selection, release, transport, processing and return will all be executed within a small fraction of a second, it is quite apparent that rapid record manipulation is vital to the success of any such MM apparatus. The invention provides a return mechanism of this type which operates reliably at the required speed. Ideally, a MM return mechanism must possess several widely diverse, and somewhat contradictory, characteristics. It must rapidly decelerate the fast-moving strip adjacent the "return" end of the file. Then, it must very quickly align it with the strips in the file and with the select rods. Next, maintaining this alignment, it must thrust the strip back into the file without disturbing the other strips and so it will be held there. Preferably, it should also help compress the file (pack) somewhat so as to make room for the injected strip and so as to redistribute the pack periodically. Such diverse constraints are very difficult to satisfy, especially with simple, reliable, uncomplicated apparatus. Nonetheless, the invention has managed to do this in a very attractive manner.

While it is not so limited, the invention is applicable to, and will be explained with reference to, specific RAM apparatus wherein unit records are randomly accessible and take the form of flexible "recordable" cards (or tape strips). In one practical embodiment, the cards include on magnetic material at least one surface whereon data may be stored in the form of discrete magnetized spots along a number of parallel tracks. This RAM apparatus is normally associated with a data processing system which is capable of operating at very high speeds. Accordingly, it is important for the individual cards to be selected rapidly from a deck (pack) of cards when called for. The selected card is transported at a predetermined speed past a processing station where the desired data transfer is carried out and is then quickly returned to the deck. These operations must be executed in a minimum time so that the card is again available in the deck for selection.

Prior art unit record processing equipment of the type described, has met with only moderate success, owing partly to the limited record processing rates heretofore attainable (excessive processing/transport cycle time). In order to speed up the overall operation of a RAM apparatus, it may be desirable to have more than one card cycling in the card path at a given time (a maximum of two is possible with the instant embodiment). Under high speed operation this requires a very rapid card-return action and a predictable time for card arrival. That is, the return mechanism must be capable of quickly stopping a returning card at a precisely predictable point, yet without damaging the card. Once stopped, the card must be quickly and accurately aligned so that its notches are in registry with the select rods and must then be rapidly thrust onto the rods and into the file to enable the next card selection cycle or allow return of a following card in the path. The total elapsed time for such "return functions" should typically be of the order of 80 milliseconds.

Heretofore available apparatus of the type described falls short of these requirements in many respects. As known in the art, neither the return-time nor the position of cycled cards is adequately predictable. The tolerances required to make allowance for these expected variations necessitates unduly lengthening the overall card transport cycle. In the process of being decelerated, a returning card characteristically strikes a stop (aligning barrier) with its leading edge. Damage to the card is avoided only by slowing it upstream of the stop—thus again, lengthening the overall card transport path (cycle time). Such as stop-impact, further, produces a certain amount of card bounce which must be allowed to settle before the rather tiny card notches can be registered with the rods, again prolonging transport cycle time. Thus, in prior art apparatus, card return mechanisms are too slow, are virtually unable to provide fine control (timing) over the stopping action or location, and are too costly, complex, and vulnerable to mechanical breakdown. This is partly because too many different parts with individual operating cycles must function in close synchronism with one another, making high speed too difficult to achieve. The invention avoids these drawbacks with a simple arrangement of multi-function parts.

Various vacuumatic decelerators have been proposed; however, none functioning to also be mechanically thrust to inject a card back into the pack while holding it aligned thereon, as in the invention. Further, none has been operatively associated with a continually-pulling vacuum source to invoke vacuum forces simply according to whether these are contracting or not. Further, none has been operated to function as a pack-retaining wall except during "card-return" times. Yet further, none has been operatively associated with a throat-defining frame to comprise such a retaining wall. Even further, none has been opeartively associated with a pair of opposed aligning stops for registering leading and trailing card edges, respectively.

Thus, it is a general object of the present invention to provide apparatus which exhibits the aforementioned features and advantages and is free of the above problems and objectionable characteristics, acting to return record strips to an MM pack quickly, in proper alignment, and to retain it there. A related fobject is to provide such apparatus whereby such a strip may be stopped and held aligned while being thrust back into the pack by a single unitary plate means.

Still another object is to provide such a system and plate means in association with reciprocating pusher means and vacuum supply means to vacuumatically stop the returning strip and hold it for insertion into the pack. A still further object is to provide such a plate means also functioning as a strip-pusher and in operative association with a simple throat-frame to keep injected cards aligned and compressed in the pack. A still further object is to provide such a plate means associated with alignment means adapted to position the strip held on the plate means for subsequent injection alignedly into the pack. Yet a further object is to provide the aforesaid plate means and lifting-alignment means in company with said throat means. Yet a further object is to provide such throat means comprising merely a rectangular frame having corner cut-outs for passing bent cards. Yet a further object is to provide such an aligning means comprising a simple solenoid-actuated lift plate.

It is a further object of the invention to provide card transport apparatus which is capable of rapidly returning cards to an MM storage location without aggressive contact with any sensitive card areas. Another object is to provide such transport apparatus capable of controllably arresting a returning card at a precisely determined time and location. Still another object is to provide such apparatus for quickly and reliably transporting a card in three successively orthogonal directions.

The foregoing and related objects, features and advantages of the invention will become more apparent from consideration of the following description including the accompanying drawings wherein an embodiment of the invention, somewhat oversimplified, generally comprises merely a return plate having vacuumatic apertures therein and being reciprocatedly coupled to a pusher means, these apertures registering with openings in an associated vacuum chamber, fixedly disposed on the "rear" side of the plate, the pusher being designed to thrust the plate forward into relative registry with a cooperating throat-frame to inject a returned strip therethrough, a lift plate also being disposed to align the returned strip as held on the return plate for subsequent injection through the throat-frame into the pack. The foregoing features, advantages and objects of the invention together with those related below, as appreciated by those skilled in the art, will become more apparent from the following detailed specification with reference to the accompanying drawings concerning a preferred embodiment of the invention.

Figure 2:
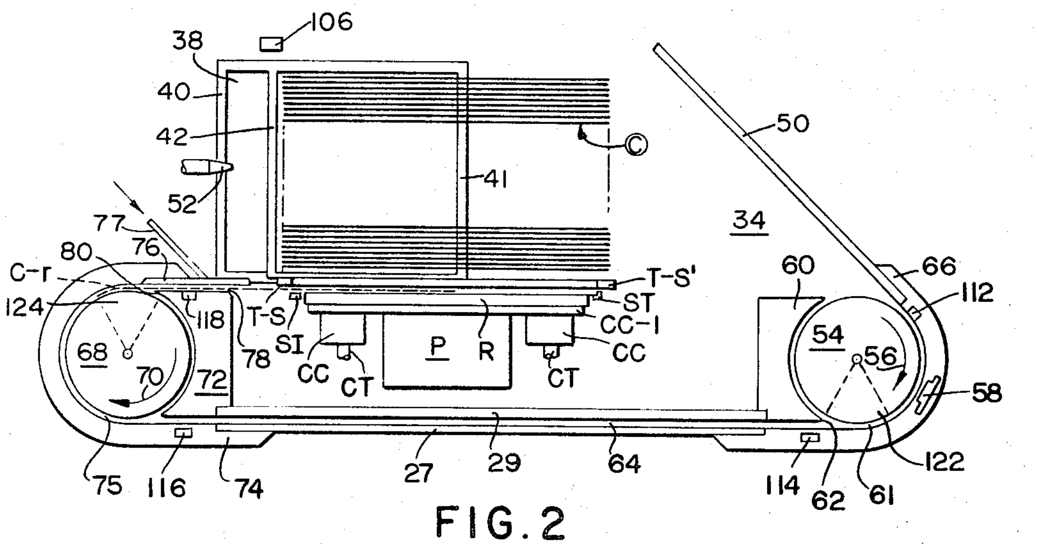
Figure 3:
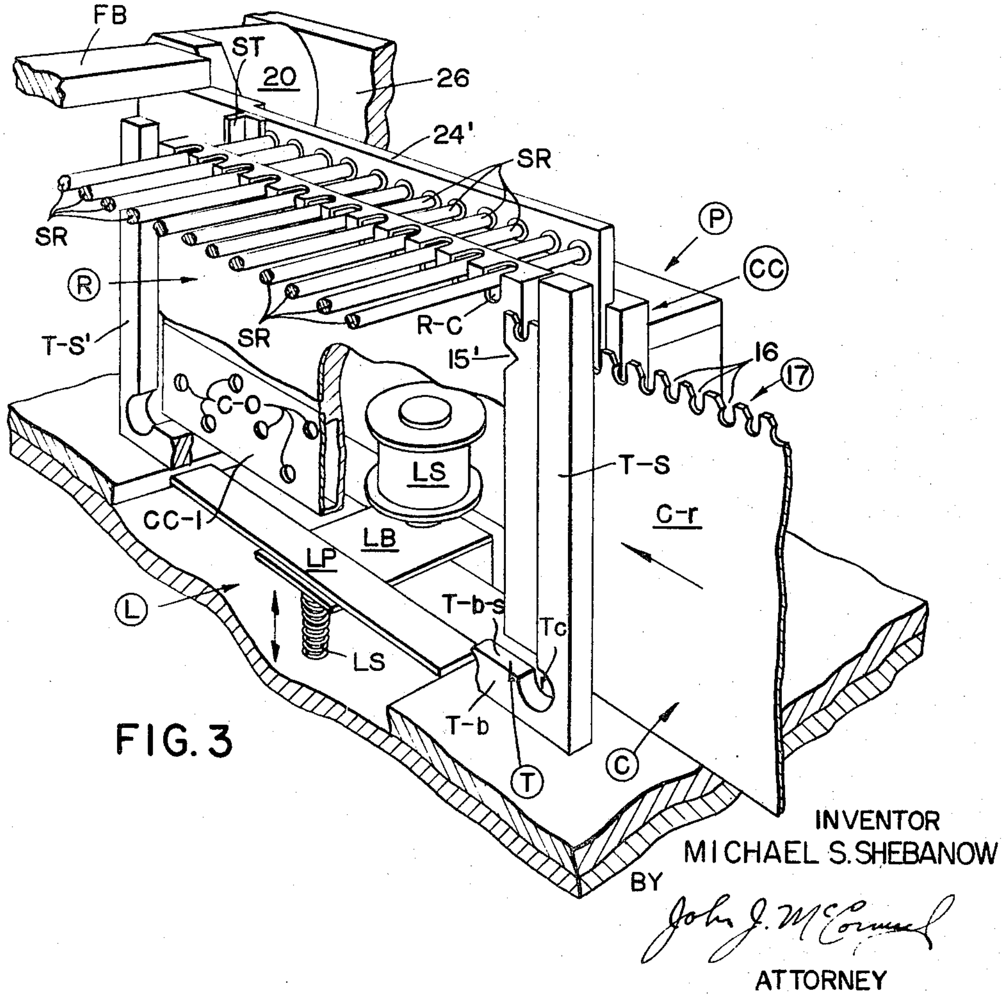
Figure 4:
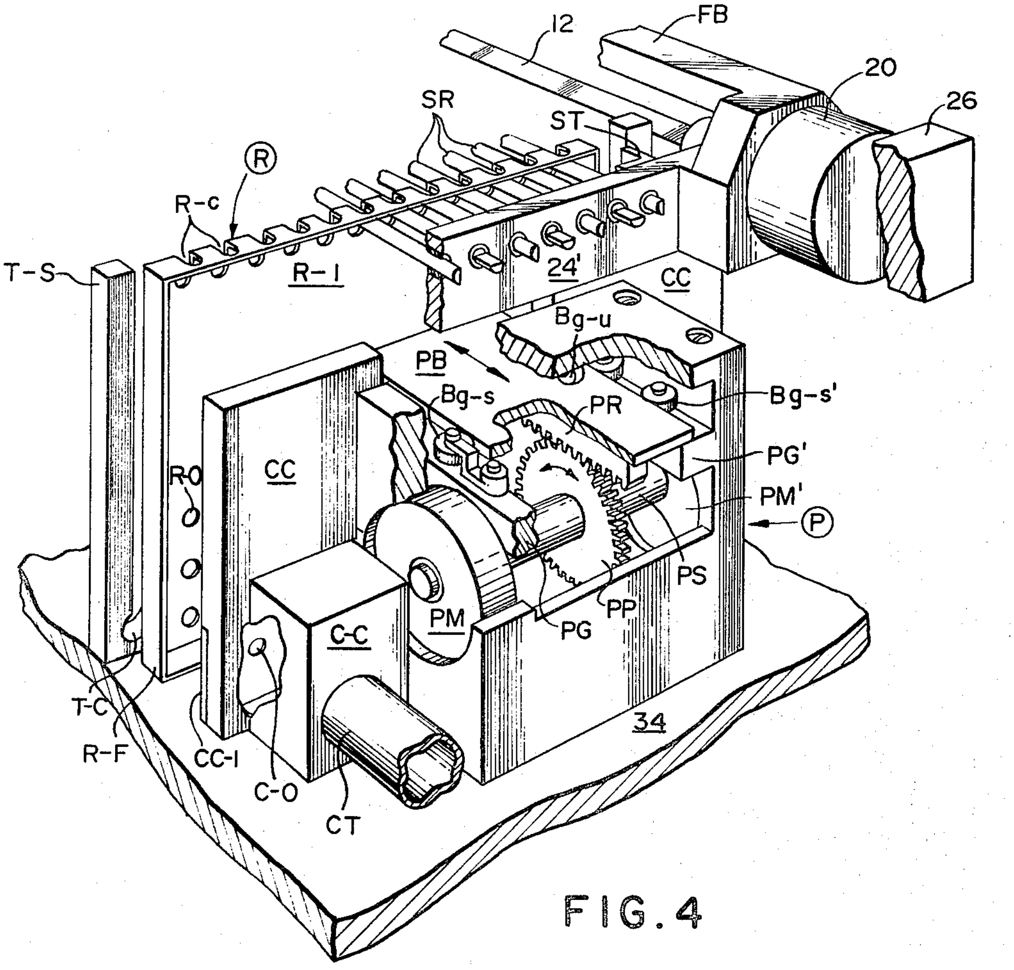
Figure 5:
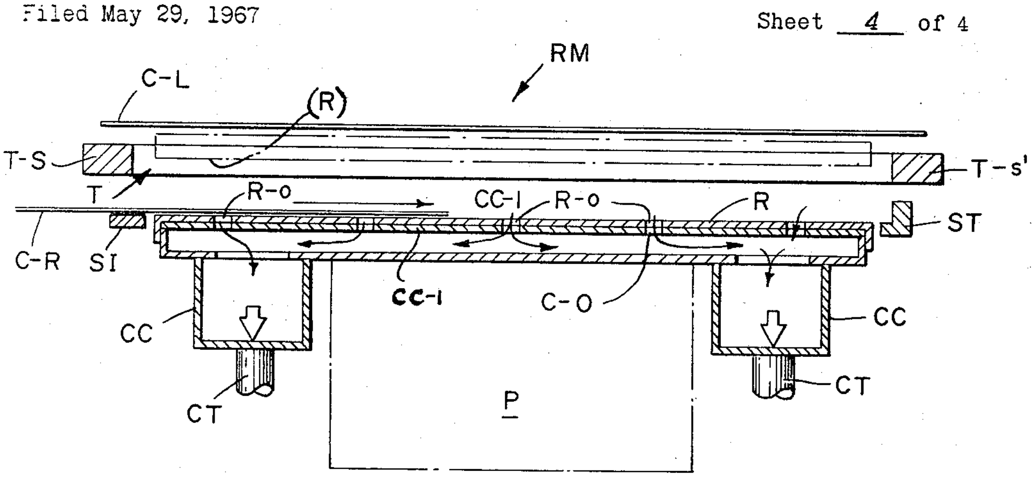
Figure 6:
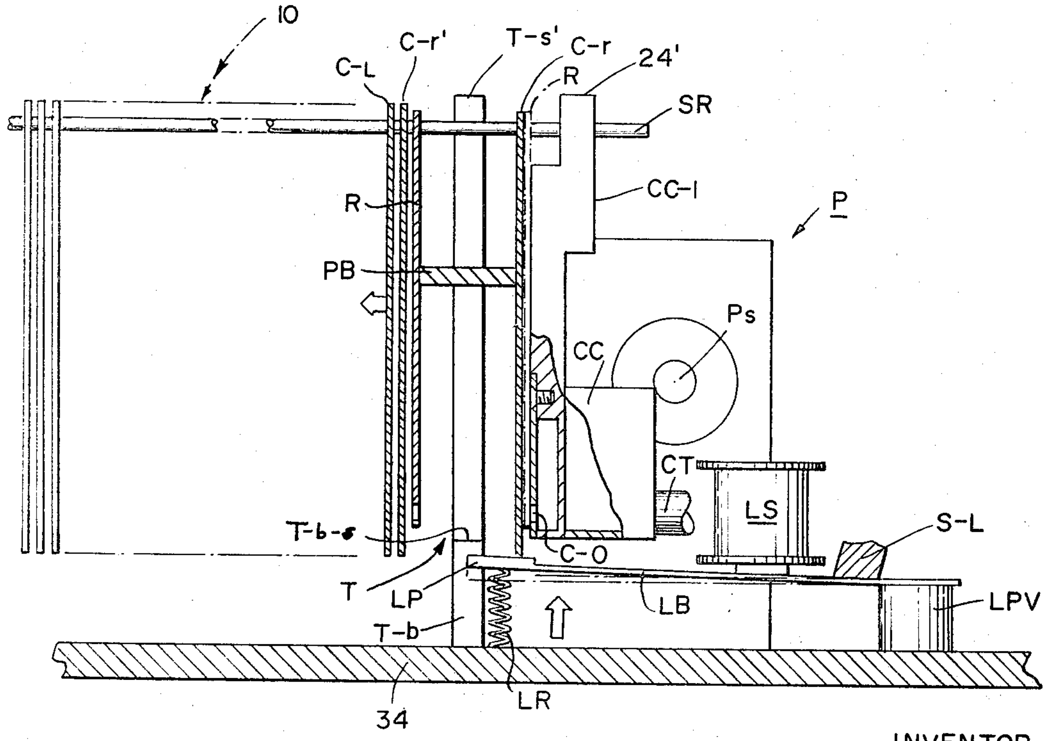

The drawings, wherein like numerals denote like parts, comprise:

FIGURE 1, an upper isometric view of an exemplary random access data-strip storage and handling apparatus of the type suitable for incorporating the present invention, various portions thereof being simplified and omitted for clarity;

FIGURE 2, a simplified plan view of the apparatus in FIGURE 1 indicating the strip file 10 and associated transport elements adapted to eject, process and return a strip and including an embodiment of a strip-return mechanism according to the invention;

FIGURE 3, an enlarged isometric elevation of the return mechanism in FIGURE 2, shown in "stop" mode from the direction of the strip file, elements being fragmentarily-sectioned for clarity, and an exemplary "returning strip" C–*r* being indicated;

FIGURE 4, an isometric elevation of the return mechanism of FIGURE 3 taken from the opposite (rear) side, portions being fragmentarily sectioned for clarity;

FIGURE 5, a rather schematic, partly-sectional, plan view of the return mechanism in FIGURE 3, many items being omitted and simplified for clarity; and FIGURE 6, a sectional side elevation of the return mechanism elements of FIGURES 3, 4 and 5, shown in relation to the strip file 10, with the return plate and the lift bar in respective "Rest" and "Up" positions, their "Stop" and "Down" positions respectively being indicated in phantom, together with an exemplary card shown being injected through the file throat.

MACHINE ENVIRONMENT

FIGURE 1 indicates a portion of a Mass Memory data processing apparatus A of a type suitable for incorporating strip returning means according to the invention. Apparatus A is adapted to randomly store a group of unit record (data) strips C in a pack or file 10 arranged in a storage magazine M. Strips C are edge-notched as known in the art so that any code-selected one thereof may be automatically abstracted from the pack to be transported and manipulated (e.g. read at head 58) and returned at ultra-high speeds, yet with no attendant damage thereto. Strips C will here be understood as being manipulated by translation about a path (circuit in FIGURE 2) roughly defined by guide wall 50, transport drum 54, guide wall 27 and drum 68 and returned to the return end C–N of pack 10 in magazine M. Strips C will be seen to be insertable in a compressed pack into magazine M which, in accordance with the invention, is generally adapted to very quickly separate (separator 52, FIGURE 2) the strips from one another and maintain them separated by a prescribed small uniform gap, despite applied stress forces (e.g. from the abstraction, selection and return forces) and despite stress on the surrounding apparatus (e.g. motor vibration at magazine).

As known in the art, strips C are substantially rectangular and are suspended in the storage magazine by known retaining/select means. A typical version of such a strip C–*r* (FIGURE 3) shows notches 16 along one edge 17 of the strip. Typical strips C may be understood to be on the order of about 3.3 x 7.4 x 0.006", though obviously a wide range of shapes and sizes may be employed (e.g. magnetic "cards"). However, the invention is especially advantageous with very thin elongate strips which give high storage density, but are especially problematical for prior art devices. Retainer notches 15, 15' are aligned for registry when strips C are gathered into a pack 10 in a magazine so as to all be selectively releasably retained by associated select rods SR, also being notched for engaging retainer rods 12, as shown and known in the art. Select rods SR are aligned along a horizontal plane intersecting opposed end walls of magazine M, being operable, as known in the art, to selectively release any code-selected strip. For the sake of clarity, only a limited number of notches 16 is shown, it being understood that in actuality notches will usually be disposed along most of the strip edge 17. As will become apparent from the discussion below, the number of notches determines the number of strips in the pack which can be randomly selected, a separate selection rod SR engaging each registered column of notches. For the sake of propaedeutic illustration, only a limited number of strips is illustrated in FIGURES 1, 2, etc., whereas in practice, strips will be understood as stacked all along the length of the rods 12, SR, being packed closer together than it is possible to illustrate (drawings not to scale).

Opposed wall plates (19, 24′) may rotatably support rods SR, 12 and may confine (opposite end strips of) the pack 10. However, preferably a thrust mechanism T (FIGURE 3A, etc.) confines the return-end of pack 10 lying in close air-film relation (cf. below) with "last-strip" C–L (FIGURE 5) after returning it. Throat T functions as a mechanical gate to admit returned strips to this end of the pack and hold them there when plate R of mechanism T is disengaged therefrom, as understood in the art and explained hereinbelow. Each strip C is a data record and may have one magnetizable surface on one side and an opposing conductive coating (e.g. carbon) on the other side for dissipating friction-induced static charges, etc. As understood in the art, data may be recorded on the magnetizable card surface in the form of discrete magnetized spots disposed in parallel tracks to be read by head 58, etc.

For magazine M in FIGURE 1, wall plates 24′, 10 may be mounted above a working surface (transport deck) 34. A solenoid 20, supported on a mounting plate 26, may be mechanically coupled to one end of each holding rod 12, as exemplarily shown, so as to controllably rotate its respective rod for strip selection (release to "drop") at "select times" to be thereafter dropped at "release time" when rods 14, 12 release all strips at notches 15′. Wall plate 24′ may contain a slot 22 in which the ends of selection rods SR are received so as to permit the rods to rotate. At the other end, rods SR extend through the plate 19, through an intermediate support plate 21 and beyond to a support assembly 23, including front and rear plates 25 and 28 respectively (only 28 shown). A set of rotary solenoids 18 is mounted on the assembly 23, in stagered relationship, on both sides of plate 28. Selection rods SR are extended to engage solenoids 18, being mechanically coupled thereto. Supporting assembly 23 forms a "file-release" carriage which is adapted to be moved in the direction of the arrow 30 when it is desired to withdraw the rods SR so as to replace a strip file 10, bar 32 being pushed to effect this withdrawal. Carriage 23 moves on a pair of rollers 33 along corresponding guide rails 35 positioned on opposite sides of the carriage. Actuators 18 on supporting carriage 23 may thus be moved (thrust rod 32) to release file 10 by withdrawing rods 14; the file, then, being replaceable.

The notches 16 preferably have one of two possible configurations, so as to uniquely define the binary address code of each card. As seen from the number of actuators 18, a 10-digit code defines each address. The cross section of each selection rod SR is such that in one of its two positions the rod is adapted to engage the corresponding notch 16 in support relationship if the notch has the proper configuration. Each holding rod 14, 12 and each selection rod has a relieved portion near its forward end, enabling it to accept card notches in any position of the rod. Rods 14 and 12 may be rotated out of supporting relationship with the notches upon the energization of the corresponding actuators at "release-time." Thus, a card may be released at random from the rods and dropped onto the surface 34 below, as shown at 10*a* in FIGURE 1.

The strips are normally suspended on the rods above a reference plane, i.e. transport deck 34. The lower (major) edge 36 of the suspended strips is parallel with deck 34, the strips hanging substantially normal thereto. A pair of photocells 108 and 110 are positioned so as to monitor the space between the strip edges 36 and deck 34. (The term photocell, as employed herein, is broadly directed to sensing means detecting strip presence). Cells 108 and 110 may be understood to include respective light sources as well as the actual sensing device, all located in the plate 19 and adapted to detect the presence of a dropped strip as known in the art. Alternatively, the light sources alone may be located in the plate 19, while the sensing devices may be positioned opposite and spaced therefrom, a strip being detected when the light beam is interrupted.

As known in the art, a waiting platform 38 includes a planar portion that lies in the aforesaid reference plane. Platform 38 constitutes a surface that closes on itself and is seen to be spaced lengthwise from the working deck 34 and coplanar therewith. The width of the platform is such that it spans the entire stack of strips suspended thereabove. An impelling bar spans the width of platform 38, as shown in FIGURE 1, its height permitting it to pass below the bottom edges 36 of the suspended strips. The impelling bar (cf. "start pos." 42) is fastened at each end to one of a pair of belts 44 which run on a pair of pulleys 46.

A servo motor 49 is adapted to drive the pulleys in the direction shown to cause the impelling bar 42 to traverse platform 38, using the latter as a guide. At the end of the platform, the impelling bar passes down through a return gap (not shown) and, as part of a single continuous action, it returns below the platform through the opposite space to its original start or rest position. Thus, deck 34 will be understood as relieved to allow this (FIGURE 1). The start position is accurately determined by the operation of a servo motor 49 which may itself be controlled from a servo circuit. The start position of the bar 42 is seen in FIGURE 1 as immediately in front of the minor (side) edges 48 of the strips. A photocell 106 is positioned to detect the presence of the bar 42 in the start position.

As aforesaid, in actual practice the strips are stacked much closer than can be faithfully represented in the drawings. In order to prevent their clinging together, an air current may be applied from a nozzle 52, positioned where most effective (e.g. atop file 10), being merely functionally represented in FIGURE 3. The nozzle may be stationary, or it may reciprocate in order to keep the cards from becoming bunched at the limits of the card deck. These limits are defined at one end by the aforesaid plate 19 and at the other end by a mechanical gate (throat T) and, at times, by return plate R, whose functions are explained below.

A guide 50 is positioned substantially normal to working deck 34 and presents a guide surface extending between the strip file 10 and a vacuum read capstan 54. The external surface of the read capstan 54 is seen to contain perforations through which a vacuum may be applied internally of the capstan in order to retain a strip in contact with the external surface. The read capstan is adapted to rotate at a constant speed in the direction of the arrow 56, so as to transport a strip held in contact therewith past a data transfer station 58 at a predetermined velocity. In a preferred arrangement, the data transfer station includes a plurality of magnetic heads, each adapted to confront a different track of the aforesaid magnetizable strip surface.

The surface of the guide 50 which is presented to the strips is continued in a guide structure 66 which abuts the guide 50. A photocell 112 is positioned on the guide structure 66 and is adapted to detect the arrival of a strip at the read capstan. The guide structure 66, together with an additional guide structure 60, present curved surfaces to the read capstan 54, to form an internal raceway 61 in cooperation with the external read capstan surface. An external raceway 64 is formed by a pair of closely spaced, parallel guide plates 27 and 29. A strip designated 10*d* is shown positioned in the latter raceway in FIGURE 1. The plates 27 and 29 continue the surfaces of the internal raceway 61. The intersection between the raceways 61 and 64 is formed by a rounded ridge 62. A photocell 114 is positioned on the guide structure 66 to detect the departure of a strip from the read capstan. A photocell 116 is positioned along the raceway 64, a predetermined distance downstream from the cell 114 and is adapted to detect the presence of a strip at that point.

The raceway surfaces of plates 29 and 27 are continued by a pair of guide structures 72 and 74 respectively. The last-mentioned guide structures form an internal raceway 75 with the external surface of a vacuum return capstan 68. The capstan 68 is similarly constructed to retain a strip on its external surface by the application of vacuum pressure and is adapted to rotate (in the direction of the arrow 70) at a constant speed, less than the speed of the read capstan 54 in the preferred arrangement. A plate 76 forms an external raceway 78 with the aforesaid guide structure 72, a rounded ridge 80 being positioned at the intersection of the raceways 75 and 78. An air conduit 77 extends through the plate 76 such that an air jet may be directed into the raceway 78. A photocell 118 is positioned on the guide structure 72 and is adapted to detect the presence of a strip in raceway 78. It will be noted that the aforesaid guide structures, particularly those defining the internal raceways, do not reach to the height of the notches 16 of the strips (e.g. 10*d*). Thus, a "selected" strip is dropped from rods SR, abstracted from pack 10 to be driven around capstans 54, 68 and returned along deck 34 to return mechanism RM, particularized below accordling to the invention, for reinsertion into pack 10. The below description relative pusher assembly P will amplify this "strip-circulation" made.

RETURN MECHANISM

As seen in FIGURES 3 through 6, the strip deceleration/return mechanism RM, taken very generally, comprises a return plate means R positionable in vacuumatic communication with a vacuum chamber means CC ("stop position") and coupled to a pusher arrangement P so as to be reciprocated away from contact with chamber CC and into registry wtih the return end of the pack ("Rest position") 10; plus a pair of stops ST, SI along this stop plane and outboard of R and a file-retaining throat means T. Further, a strip-aligning lift mechanism L is also disposed adjacent plate means R (when R is in "stop position") and just below to lift strips retained thereon up into alignment with select rods SR etc. Lift mechanism L and throat means will be more completely described below. Select rods SR are journaled in a plate 24′ suspended from a bracket member FB of the magazine. Bracket FB also functions as an anti-tilt stop, holding the unselected strips aligned (by their upper edges 17) when retainer rods 12 are released.

Return plate R will be understood to be a thin, preferably metallic, plate of rectangular configuration somewhat shorter in length and height than strips C and being adapted to come into near-registry with the throat opening formed by frames TS, TS′, TB or throat T, this opening being somewhat smaller (about ¾ in. less in width and height) than the outline of a strip to pass through the throat readily and bend the strip through. Plate R includes an upper portion R–1, the upper edge of which is relieved, at portions R–C, to admit select rods SR (including rotating radius). The lower portion of plate R (cf. FIGURE 3) includes an array of apertures R–O, spread uniformly and symmetrically across R. Apertures R–O are large enough (e.g. 50 mil in. diam. for 12 apertures) and in such a pattern as to partially decelerate a return card C–*r* of prescribed mass and speed (here, about 200 in./sec.). Apertures R–O are in substantial registry with like openings C–O (30 mil diameter) in a front-plate CC–1 portion of vacuum chamber CC. Plate CC–1 is adapted to mate against plate R. Thus, the vacuum through apertures R–O/C–0 will subject an overlying card (such as returning card C–R in FIGURE 3) to sufficient decelerating vacuum pull from chamber CC to slow it (letting it be stopped against stop ST) and thereafter hold it against R. Strip C–R, for instance, will have to be held against plate R while lift means L elevates it, sliding it into proper registry, i.e. notches 15 with rods SR (relieved along this "stop-plane"), so that when pusher mechanism P advances plate R into registry with throat T the strip may be snapped returningly through T to rejoin pack 10. The strip-engaging face of plate R should be quite flat and of relatively low friction/high wear material to prevent sliding strips from damaging themselves or the plate. This face should also be such as to very quickly release a strip (e.g. through the throat and into file 10)—i.e. be "non-sucking," with no "gauge block effect," whereby interfacial vacuum holds a strip against R. According to another feature of the invention, all these results may be achieved simply by coating this face very uniformly with low-friction "strippling" material, such as "Scotchlite" beads, or the like. This uniform stipple maintains at least a thin film of air between strip and plate for quick release.

As indicated in FIGURES 3, 4 and (sectionally) in FIGURE 5, vacuum chamber CC, including front plate CC–1, is almost the width of plate R, being somewhat shorter and being cut out to pass pusher bar PB (as indicated in FIGURE 4). Chamber CC communicates, such as through tubes CT, with a pumping system as known in the art and has a volume (thickness) sufficient to provide adequate pumping throughput and stability, such as at about 15–20 cf./min. at about 15 in. water vacuum.

As generally indicated above, a pusher mechanism P is adapted to reciprocate plate R between the "stop" position, i.e. engaged against chamber CC (cf. FIGURE 6), and the "forward" ("rest") position, just beyond throat T (as indicated in FIGURES 6 and 5 in phantom). To effect this, a pusher bar PB is attached somewhat centrally behind the upper portion of plate R. Bar PB is somewhat elongate and rectangular with the opposite end thereof disposed in a guideway defined, laterally, between opposed pairs of side-rollers BG–S, BG–S′ and, vertically, by (sliding along) a pair of guide flanges PG, PG′, being held and guided thereon by a plurality of upper guide rollers BG–U. A toothed rack section PR is attached along the bottom of bar PB at this guided end and adapted to be drivenly meshed with a pinion gear PP, selectively rotated by a pair of forward and reverse motors PM, PM′ respectively. These preferably comprise "moving coil," or "rotary solenoid," type motors of moderate power dissipation (e.g. about 8 watts here), and are light (50 gm. load) and quickly driven by a moderate current pulse. Associated with the drive train for bar PB are a pair of stops (not shown) to establish its excursion limits ("Stop" and "Rest" positions of R) plus a pair of "Stop" and "Rest" limit sensors (not shown), each being arranged to automatically control both motors PM, PM′ in a respective pushing direction. That is, when a given motor has thrust bar PB to within a prescribed distance of the associated limit stop, the limit sensor associated therewith will automatically de-energize that motor in a prescribed manner (e.g. gradually decelerate it), while also energizing the other motor to urge bar PB oppositely and thus, very, very quickly (and precisely) brake it. Such an "opposed coil" reciprocator arrangement is very simple, yet fast and precise, in stop/start response, being able to advance plate R in about 15 ms. from rest and with no perceptible "bounce."

An appreciation of the operating speed necessary for the return mechanism RM (pusher P thereof) may be had from the following recital of strip handling times. If a given strip (1) is selected (at time $t_0$) dropped, abstracted (by 42) to guide 50 and drum 54, a second strip (2) may normally next be "selected" e.g. dropped, etc. at $t_1$) by the time 1 "clears" head 58 (trailing edge uncovers cell 114. Now (as seen below) return plate R is needed to align the file 10 (especially the last strip C–L) until a strip has dropped (i.e. till $t_1$ for 2) and will take a given time ($Dt_A$) to be translated to adjacent the vacuum supply (stop position). But it may only take strip 1 a relatively short time ($Dt_R$) to arrive at (enter) RM (from time $t_1$ when it "cleared" cell 114.). This "return time" $Dt_R$ may be on the order of 20 ms. in this type embodiment and will constitute part of a "selection delay," throughout which the system is "dead" and no following selection is possible. The plate return time (approx. $Dt_A$) will comprise a like "dead time." Thus, it will be graphically clear to those in this art that the value of the machine (machine speed or access time) will critically depend upon actuation speed $Dt_A$. With the invention, such activation is performed during strip returin ($Dt_R$) and made very fast (order of 15 ms. $Dt_A$) compared with conventional devices, also contributing no "dead time." Return pusher activation time is even more critical for machines, like the instant one, requiring return of the pusher plate to adjacent the file (see below where this "rest" position of R allows last strip C–L to be selected), thus disabling selection (e.g. of selected strip 3) until the plate has completed an entire "return cycle" (e.g. until R has retracted to "stop" strip 1 and then returned it to the pack, strip 2, still circulating).

Thus, pinion gear PP is affixed on a drive shaft PS to be selectively rotated either clockwise or counterclockwise, according to whether a "forward pulse" is applied to motor PM to thrust plate R forward or a "reverse pulse" is applied to motor PM′ to drive R oppositely. Thus, when a "reverse pulse" is applied to motor PM′ to pull plate R away from file 10 and through throat T, R is brought quickly into decelerating vacuumatic engagement against vacuum chamber CC so that openings R–O may thereafter act upon (be covered by) a returning strip, such as C–R in FIGURE 3 to slow it and hold it aligned, as described below. On the other hand, when a "forward pulse" is applied to motor PM′, plate R will be driven oppositely to return through throat T (snapping strip C–*r* therethrough, held thereon, back into pack 10—the strip sliding along LP and rods SR therewhile). The number and diameter of openings C–O, R–O will be understood as variable, as is necessary to slow and to retain a strip on plate R having a certain mass, speed, etc.

Throat T will be understood as providing a rigid frame slightly less (e.g. a few mils) than the strip width and height to maintain the file 10 (last strip C–L) in place when plate R returns to "stop position" (prevent C–L from "following" R). For strips of the aforedescribed weight and size (7 in. width) a "top-stop" like flexure S–F (FIGURE 6) is preferred, though not needed with strips substantially smaller or lighter. Corner cut-outs CT are provided to accommodate the passing deformation of inserted strips of prescribed weight, thickness, stiffness etc. so as to prevent abusing strip corners there.

ALIGNING

As best indicated in FIGURE 3, the return arrangement is also preferably associated with a lifting arrangement L adapted to lift a returned strip C–R (here the 281 mil "drop" distance) from the level of deck 34 (along whch it is transported) up, slidingly along plate R (against which it is being vacuum-held) to register notches 15 about select rods SR and so that thereafter C–*r* may be returned in proper alignment with the file 10. For this purpose, a solenoid pivoted lift arrangement is preferably provided, comprising a lift plate LP mounted on one end of a lifting rod LB pivoted at its opposite end on a suitable pivot means LPV, LB being electromagnetically attractable, selectively, by a lifting solenoid LS, of known construction and as known in the art. LB is urged returningly to a "rest" (down) position out of engagement with solenoid LS by a return spring LR as known in the art. Thus, as best indicated in FIGURE 6, plate LP is adapted to be normally held down (by spring LR) to be relatively coplanar with (or somewhat lower than) transport deck 34 until after a returned strip C–R has been injected to, and stopped along the face of plate R, i.e. after being finally brought to a stop against end stop ST (see FIGURE 5), ST thus positively establishing its lateral aligned position. Thereafter, a "lift signal" may be applied to activate lift solenoid LS which, as understood in the art, may project an attracting field to pull lifting rod LB upward, toward its core (and an associated stop, preferably) to cause lift plate LP to be pulled upwardly so as to slide strip C–R along the face of plate R, stopping at a prescribed "up" position (FIGURE 6), corresponding to the registry of the card notches 15 with select rods SR as aforesaid.

As indicated in FIGURE 5, a lead-stop ST is provided to finally arrest the returning strip, being comprised of a resilient material (e.g. polyurethane). ST preferably includes a flange to maintain card C–R relatively coplanar with the face of plate R held thereagainst and is laterally positioned to register notches 15 with rods SR. "Lead-stop" ST cooperates with a companion "trailing stop" SI, having a lateral edge positioned to be spaced from stop ST slightly more than (e.g. 10 mils more) a normal strip length so that any rebound from stop ST will thrust the trailing strip edge against this reference edge, thus reducing (practically eliminating) bounce and maintaining the aforementioned notch/rod registry. Thus, as understood from FIGURE 5, trailing stop SI will assume a position such that returning cards C–R slide across the face thereof (which is slightly forward, or downstream, of the (stop) plane of plate R) to drop into coplanarity with plate R when registering against "lead-stop" ST.

OPERATION

Although the foregoing should enable those skilled in the art to understand the structure and intended operation of this embodiment, some operational features will now be briefly indicated for purposes of emphasis, clarification and summary. First, it will be assumed that during the operation of the described "RAM" machine A, a particular strip C has been selected and withdrawn from file 10, to be transported about the path indicated, being processed therewhile, and is now, at $t_i$, passing sensor 114. The output from this sensor now temporarily "locks-up" the selection means and causes a "reverse pulse" to be applied to motor PM′ to pull return plate R away from pack 10 (strip removal is forbidden till it returns) and into vacuumatic engagement (FIGURE 6) with chamber CC. This translation takes a given time $t_{ii}$ (about 20 ms. according to the push-drive of the invention). Shortly thereafter, at $t_{iii}$ (but not before—$t_{iii}>t_i+t_{ii}$), the selected strip C will begin entering return mechanism RM having assumed the position of strip C–R in FIGURE 3. At this point strip C–R is sliding along deck 34 (and plate LP) and across the face of return plate R. Since the vacuum means is constantly evacuating chamber CC and pumping through apertures R–O, it will be understood that as strip C–R slides rapidly across the face of plate R, an increasing vacuum pull will be exerted on it, through openings R–O and pull it deceleratingly (frictionally) against R with increasing force to slow it gradually before it strikes "lead" stop ST. Each opening R–O contributes a prescribed deceleration/holding force, these forces gradually building up to a maximum as the strip leading edge strikes ST (FIGURE 5). This vacuum also holds a strip against R during alignment shifts, as well as providing a gradually increasing vacuumatic deceleration and desirable continuous stopping action. This is accomplished, according to a feature of the invention, using an extremely simple vacuumatic arrangement and one which is "self-switching" i.e. releasable without "valving," as will be appreciated by those skilled in the art. For instance, a machine approximating this embodiment has been observed to decelerate and hold strips of the described mass and injected velocities of about 100 to 300 in./sec. with a vacuum of about 15 in.-water and a flow of about 15–20 c.f./min. In the prior art, such a low pressure/high volume pull would be switched on/off with valves. The invention eliminates such valves and saves precious "switching" and "valving" time by pumping constantly and merely translating plate R to release the pull thereon (self-switching).

Next, the leading edge of the strip will register against stop ST and its trailing edge fall in from the face of trailing stop SI to index against the registration side thereof, given any slight rebound action. The strip is now, (time $t_{iv}$) held rather firmly (by the vacuum) against the face of plate R between stop edges (ST, SI) and is ready to be vertically aligned.

Now, the second phase of the return operation may be invoked (e.g. automatically by sensing that the trailing edge has passed SI zone), i.e. at time $t_v$, "stopped" strip C–R may be vertically aligned by lift plate LP, being lifted up across the face of plate R (being sucked therewhile against R), so that its notches are properly indexed in relation to select rods SR. This may be automatically effected simply by the application of a "lift" pulse (responsive to aforementioned sensing) to lift solenoid LS sufficient to attract LP into "up" position (cf. FIGURE 6). A stop SL establishes this position without damaging stress on the strip or on LS. This vertical aligning embodiment is not the only one that might be used, but it relatively light, and easy to implement and quick, as evidenced by the fact that applying about 300 amp-turns pulse to coil LS lifts a typical strip into alignment in about 10 ms.

The third phase of the return operation may now be invoked wherein the card is to be thrust forward and bent through throat T to join the pack and be retained therein. Thus, simply sensing the completion of the foregoing "lift-up" (by sensor means, notshown) and responsively applying a "forward pulse" to motor PM at time $t_{vi}$, (to rotate pinion PP so as to thrust bar PB a prescribed stop-limited, controlled-breaking amount as aforedescribed). This advances plate R forward between the confines of the throat frame T, carrying the strip C–R through the frame the card being bent somewhat to pass through the attenuated throat; cf. bent card in phantom in FIGURE 6 to assume a prescribed "rest" position (FIGURE 6) in the file, plate R releasing the strip there and standing adjacent as the separation-flow positions it. Plate LP guides the strip's bottom edge during this advancement to the pack. When strip C–R is so bent, it will be understood to extend its bottom corners, compensatingly, into cut-outs CT as it negotiates the throat constriction and, having been snapped through throat T, will then be pressed (as much as is desired, e.g. for file-joggling) by plate R against the last card in the pack (C–L) to be held there (cf. C–R in FIGURE 6) by throat T when plate R is later retracted. As indicated (in full) in FIGURE 6, this "rest" position spaces it slightly (separation distance) from the nearest ("last") strip so that a separating air flow, passing therebetween, makes this strip as "selectable" as any other and able to drop cleanly—something prior art machines have found impossible:

The "forward pulse" may also be used to control the release of solenoid LS (possibly with a slight delay) so that plate LP is allowed to be spring-returned, to its "rest" condition (indicated in phantom). Plate R, lift unit L and pusher P are now in condition to begin a new decelerate/align/return cycle, motor PM' being commanded upon the approach of the next "returning strip" to thrust plate R back into engagement with chamber CC in time to receive the next "returning" strip as in the preceding example.

Those skilled in the art will recognize that the aforedescribed return mechanism embodiment, and modified versions of it, will provide an efficient, inexpensive mechanism for both decelerating returned cards, aligning them properly and thrusting them back into a file, yet doing so with surprisingly few, uncomplicated parts, simply arranged. This mechanism is also quite versatile, being modifiable, for instance, to include return plate, throat and lifting elements of varying sizes corresponding to different card dimensions. Further, the simple application of greater or less pumping force to chamber CC, may provide greater or less deceleration and holding force at the return plate apertures, for instance, for cards of different weights or different returning speeds. This return mechanism is not only simple to fabricate, but will be recognized as easy to maintain and to remove and replace. One of the most important advantages is that the gradual deceleration and returning engagement with, and thrusts against, the strips are unusually gentle and thus far less likely to damage strip edges etc. then competing prior art mechanisms, which are apt to impact strips abruptly.

From the foregoing description and illustration of a preferred embodiment of the invention, it will be clear that the invention is not limited to the specific features disclosed. For example, the lifting mechanism L vacuum supply means, etc. may be readily modified and differently implemented where appropriate. Of course, the card-retaining and selecting rods SR may likewise be modified or substituted for by other equivalent means. Likewise, although the invention has been described in connection with a specific strip processing system, it will be recognized that it is not so limited and that it may find application wherever a card or strip-like document needs to be quickly and precisely aligned and shifted in successive orthogonal directions (e.g. positioned in three dimensions). As previously pointed out, different operating parameters may be obtained by varying the shape, size or number of the orifices, or by varying their (uniform) distribution as long as a strip is retained against the return surface and kept relatively flat, their not being limited to that shown. The size of the vacuum reservoir may be adjusted, i.e. as it decreases, the covering up of each hole will produce a proportionately greater strip-sucking effect rendering the strip-deceleration less gradual and more discrete (step-like) and more abrupt; whereas increasing its size will produce a slower more linear response. In any case the strip is allowed to register against stop ST.

I claim:

1. In a transportation apparatus for manipulating unit records, diverting means for diverting said records singly to a reference position, said diverting means comprising:

surface means positioned to make parallel sliding contact, along a contact surface thereof, with a moving "record-to-be-diverted"; said surface means including a plurality of apertures therethrough and spaced thereacross, at least in the direction of record travel; vacuum means disposed to engage said surface means opposite said surface so as to apply vacuum suction through said apertures whereby to apply a decelerating/holding force to an arriving record as it slides across said surface, covering successive apertures therein; and pusher means adapted to reciprocate said surface means away from engagement with said vacuum means and into said position carrying a retained record there, and then return.

2. The combination as recited in claim 1 wherein said apparatus is adapted to abstract records singly from a pack thereof in a file means, and said diverting means adapted to return them to this file means, said reference position comprising the return end of this pack; wherein said surface means is positionable, in a first condition, to make parallel sliding contact with a moving record-to-be-returned; wherein said vacuum means includes vacuum reservoir means vacuum-registerable with said apertures in said first condition plus supply means for constantly applying vacuum suction to said reservoir means for direction through said apertures for imposing a gradually increasing decelerating and holding force on said record through frictional contact therewith of said surface as successive apertures are covered thereby; and wherein said pusher means is adapted, responsive to a first signal, to reciprocate said surface means into a second condition at said pack end, away from said reservoir means, for thereby returning said record to said pack and is also adapted, responsive to a second signal, to return said surface means to said first condition in suction engagement with said reservoir means.

3. The apparatus of claim 2 wherein said reservoir means includes a surface adapted to closely engage said surface means and including holes registerable with said apertures to apply said suction therethrough only when said surface means is in said first condition, said vacuum means being constantly "on," so that only the movement of said surface means into said second condition is required for releasing suction thereat.

4. The combination recited in claim 1 wherein are also included lateral and vertical alignment means operatively disposed about said surface, when so suction-engaged in said first condition, so as to reference-position a record thereon.

5. The combination recited in claim 1 wherein said diverting means comprises a reference transport deck; wherein said surface means comprises a plate having said contact surface normal to said deck and adapted to be selectively positionable in a prescribed "stop" condition placing said surface along a "stop plane" whereby to make sliding surface contact with a returning one of said records traveling edgewise along said deck, said surface means also being reciprocable, selectively, into said reference position and return; wherein said vacuum means is operative and disposed so that when said plate is in said "stop" condition, it may vacuumatically pull in-sliding records frictionally against said surface, being directed through said apertures to apply a gradually increasing decelerating/hold force as successive apertures are covered; and wherein are included vertical alignment means disposed in operative association with said surface at said "stop plane," being adapted to periodically lift said records, suction-held thereon, sufficiently to vertically register them at a prescribed level; and wherein said pusher means is coupled to said plate and controlled to periodically translate it away from said "stop" condition to place said surface at said "reference" position, after said vertical alignment, so as to carry a record held thereon, to that position, said pusher means also being controlled to subsequently return said plate to said "stop" condition for engaging a following record.

6. The apparatus of claim 5 wherein said reference position comprises the return end of a record storage file; wherein a throat frame is disposed adjacent said return end and interposed in the advancement path of said records between said conditions of said plate, said frame being constructed and arranged so as to prevent passage of a record therethrough except when pushed by said plate unidirectionally therethrough, whereby to retain records returned to said file.

7. The apparatus of claim 6 wherein said records are stored in a pack in said file, being removably suspended therein on a set of rods positioned above said transport deck to hang relatively vertical thereon, said rods engaging corresponding notches in a suspended record for selective drop-release selection thereof; and wherein said vertical alignment means comprises a lift bar normally disposed to comprise an extension of said transport deck under said contact surface in "stop" condition, also being coupled to lift means adapted to periodically lift said bar, upon command, to said reference level whereat said notches and rods are registered, and to thereafter return said bar to said deck level.

8. The combination of claim 1 wherein is also included unidirectional throat means disposed intermediate the path of a record translated on said surface for preventing return of the record when said surface means is returned from said reference position.

9. Return-transport apparatus for unit records adapted to return, singly, to a prescribed pack in a storage file those records which have been selected and manipulated, said apparatus comprising a reference deck; a return plate having a stopping surface positionable along a "stop plane," normal to said deck, whereat it may engage, in sliding surface-contact, returning ones of said records sliding edgewise along said deck in a first direction, stop means disposed downstream of said surface for limiting travel of said returning records in said first direction, said surface including a plurality of apertures therethrough; vacuum means including reservoir means having face plate means with vacuum-conducting holes therein, said holes being arranged to vacuumatically register with said apertures when said surface is positioned in said stop plane whereby to apply a prescribed "hold-decelerate" suction on said records as they slide across the surface; lift means for urging a record, so held on said surface, periodically, in a second direction from the level of said deck to a prescribed reference level; and advance means adapted to periodically thrust said plate with an aligned record so held thereon in a third direction to advance said stopping surface out of said "stop plane" to a prescribed "rest plane," carrying said record held aligned thereon to one end of said pack returningly, these three directions being mutually orthogonal.

10. The combination recited in claim 9 wherein is also included throat means disposed adjacent said "rest" plane to intercept said advancing record adjacent said pack end and retain it there when said plate surface is returned to said "stop" plane.

11. The combination as recited in claim 9 wherein said advance means includes a drive shaft affixed to said plate to so advance it; plus a pair of, "Forward" and "Reverse," drive motors coupled to said drive shaft so as to thrust it in respective, opposite advance directions upon application of respective "Forward" and "Reverse" signals thereto; plus a pair of opposed stop limit means operatively disposed to limit said advancement at opposing excursion extremes defining said "plane" positions of said plate surface; and plus a pair of opposite brake sensor means arranged adjacent a respective one of said stop means, upstream thereof, each being adapted to terminate a respective signal to the "then-advancing" one of said motors and to also apply the other signal to activate the other motor at a prescribed "braking point" along a respective advance excursion and thereby provide a fast, precise advancement and fast, though gradual and controlled, braking of said plate in a simplified reliable manner.

12. The combination as recited in claim 11 wherein said motors each comprise a self-limiting, moving coil motor, each being coupled to drive said shaft oppositely in rack-and-pinion fashion.

13. The combination as recited in claim 9 wherein said stopping surface is provided with a low-friction beaded coating adapted to prevent records from being suction-urged "dash-put" like, thereagainst after disengagement from said vacuum means, preventing air from being completely evacuated from between the surface and a record held thereon.

14. The combination as recited in claim 12 wherein said stopping surface is provided with a low-friction, glass-bead type coating adapted to prevent records from being suction-held thereagainst after disengagement from said vacuum means; wherein said motors are controlled to keep said surface normally at said "rest plane" in pack-defining relation with the end-record thereof, also being controlled to return said surface to said "stop plane," automatically responsive to the sensed condition of a subject "returning-record;" wherein said storage file includes a throat frame adjacent said pack and interposed in the record advancement path between said plate positions, said frame being constructed so as to prevent passage of a record therethrough except when pushed by said plate therethrough so as to retain returned records in said pack; wherein said records in said pack are normally suspended on a set of rods positioned above said transport plane to hang relatively normal thereto, said rods engaging corresponding notches in a suspended record for selectable drop-release thereof; wherein said lift means comprises a lift bar normally disposed to comprise an extension of said transport deck under said contact surface in said "stop plane," also being coupled to lift means adapted to lift said bar, upon command, to a reference level where said notches and rods are registered, and to subsequently return it, said return of said bar being delayed to retain it at said level until advancement of said plate so as to guide the returned-record held thereon.

References Cited

UNITED STATES PATENTS 3,280,992 10/1966 Iblings ------------ 129—16.1

EDWARD A. SROKA, *Primary Examiner.*

U.S. Cl. X.R.

271—3; 214—7